(12) United States Patent
Lakshminarayan et al.

(10) Patent No.: US 12,621,043 B2
(45) Date of Patent: May 5, 2026

(54) REPEATER FOR ENROLLMENT EXTENSION

(71) Applicant: Resideo LLC, Golden Valley, MN (US)

(72) Inventors: Nagaraj Chickmagalur Lakshminarayan, Karnataka (IN); Anand Kavatekar Narayan Rao, Bangalore (IN); Sachin Prakash Maganti, Bangalore (IN); Sheetal R Kadam, Bangalore (IN); Arun Handanakere Sheshagiri, Bangalore (IN)

(73) Assignee: Resideo LLC, Golden Valley, MN (US)

( * ) Notice: Subject to any disclaimer, the term of this patent is extended or adjusted under 35 U.S.C. 154(b) by 325 days.

(21) Appl. No.: 18/259,298

(22) PCT Filed: Jan. 5, 2022

(86) PCT No.: PCT/US2022/011233
§ 371 (c)(1),
(2) Date: Jun. 26, 2023

(87) PCT Pub. No.: WO2022/150329
PCT Pub. Date: Jul. 14, 2022

(65) Prior Publication Data
US 2024/0063889 A1    Feb. 22, 2024

Related U.S. Application Data

(60) Provisional application No. 63/134,679, filed on Jan. 7, 2021.

(51) Int. Cl.
*H04B 7/155*    (2006.01)
*H04L 5/00*    (2006.01)

(52) U.S. Cl.
CPC ....... *H04B 7/15507* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 6,031,827 | A | 2/2000 | Rikkinen et al. |
| 6,470,006 | B1 | 10/2002 | Moulsley |
| (Continued) | | | |

FOREIGN PATENT DOCUMENTS

| | | |
|---|---|---|
| CN | 103596191 B | 12/2016 |
| EP | 2757837 A1 | 7/2014 |
| (Continued) | | |

OTHER PUBLICATIONS

Mohamad Jaafer Ali, et al., "Efficient Medium Access Arbitration Among Interfering WBANs Using Latin Rectangles", ARXIV.org, Cornell University Library, Jan. 27, 2017, XPO80752029, 18 pgs.
(Continued)

*Primary Examiner* — Diane L Lo
(74) *Attorney, Agent, or Firm* — Greenberg Traurig, LLP; Nicholas Martin; David J. Dykeman

(57) ABSTRACT

A system includes a sensor device, a repeater, and a control panel. The sensor device is in two-way communication with the repeater, and the repeater is in two-way communication with the control panel. The repeater includes a repeater module storing child table data and routing table data. The child table data stored by the repeater module, at the repeater, includes a sensor device address, sensor device descriptor, and/or sensor device status. The routing table data stored by the repeater module, at the repeater, includes channel operational information, such as a network ID, a first repeater operating channel of the repeater, a second (Continued)

repeater operating channel for the repeater different than the first repeater operating channel, a first information channel, and/or a second information channel different than the first information channel.

20 Claims, 2 Drawing Sheets

(56) References Cited

U.S. PATENT DOCUMENTS

| | | | |
|---|---|---|---|
| 6,690,657 | B1 | 2/2004 | Lau et al. |
| 7,593,422 | B2 | 9/2009 | Shvodian |
| 8,228,859 | B2 | 7/2012 | Wang et al. |
| 8,467,357 | B2 | 6/2013 | Wang et al. |
| 8,884,774 | B2 | 11/2014 | Sanderford, Jr. |
| 9,285,988 | B2 | 3/2016 | Kenney et al. |
| 9,312,976 | B2 | 4/2016 | Zhang |
| 9,565,657 | B2 | 2/2017 | Suresh et al. |
| 9,736,703 | B2 | 8/2017 | Goldsmith et al. |
| 9,814,038 | B2 | 11/2017 | Suresh et al. |
| 9,872,146 | B2 | 1/2018 | Mycek et al. |
| 9,913,232 | B2 | 3/2018 | Seo et al. |
| 9,930,641 | B2 | 3/2018 | Beema et al. |
| 9,978,237 | B2 | 5/2018 | Britt et al. |
| 10,039,052 | B2 | 7/2018 | Zhou et al. |
| 10,051,494 | B2 | 8/2018 | Rengarajan et al. |
| 10,091,786 | B2 | 10/2018 | Schmidl et al. |
| 10,129,916 | B1 | 11/2018 | Lakshminarayan |
| 10,237,237 | B2 | 3/2019 | Dawes et al. |
| 10,499,405 | B2 | 12/2019 | Lee et al. |
| 10,798,539 | B2 | 10/2020 | Marschalkowski et al. |
| 10,833,754 | B2 | 11/2020 | Desclos et al. |
| 10,913,094 | B2 | 2/2021 | Li et al. |
| 11,184,322 | B2 | 11/2021 | Dawes et al. |
| 11,329,842 | B2 | 5/2022 | Lakshminarayan et al. |
| 11,425,199 | B2 | 8/2022 | Eskildsen et al. |
| 2003/0137993 | A1 | 7/2003 | Odman |
| 2005/0058149 | A1 | 3/2005 | Howe |
| 2006/0068820 | A1 | 3/2006 | Sugaya et al. |
| 2007/0090996 | A1 | 4/2007 | Wang |
| 2008/0032738 | A1 | 2/2008 | Lemke et al. |
| 2008/0255636 | A1 | 10/2008 | Delmain et al. |
| 2009/0103488 | A1 | 4/2009 | Zhu et al. |
| 2011/0038356 | A1 | 2/2011 | Bachrach |
| 2012/0044827 | A1 | 2/2012 | In et al. |
| 2012/0166338 | A1 | 6/2012 | Agnelli et al. |
| 2013/0320080 | A1 | 12/2013 | Olson et al. |
| 2014/0321344 | A1* | 10/2014 | Kore ................ H04W 52/0206 |
| | | | 370/311 |
| 2014/0324410 | A1 | 10/2014 | Mathews et al. |
| 2014/0375428 | A1 | 12/2014 | Park |
| 2015/0108901 | A1* | 4/2015 | Greene .................. H05B 47/19 |
| | | | 315/149 |
| 2015/0356332 | A1 | 12/2015 | Turner et al. |
| 2016/0029346 | A1 | 1/2016 | Suresh et al. |
| 2016/0044661 | A1 | 2/2016 | Suresh |
| 2017/0055199 | A1 | 2/2017 | Petersen et al. |
| 2017/0223615 | A1 | 8/2017 | Lee et al. |
| 2017/0230810 | A1 | 8/2017 | Banerjea |
| 2017/0273013 | A1 | 9/2017 | Edara et al. |
| 2017/0332049 | A1 | 11/2017 | Zhang |
| 2017/0359790 | A1 | 12/2017 | Wang et al. |
| 2018/0041959 | A1 | 2/2018 | Yang et al. |
| 2018/0098263 | A1 | 4/2018 | Luo et al. |
| 2018/0242100 | A1 | 8/2018 | Gandhi et al. |
| 2018/0242312 | A1 | 8/2018 | Gandhi et al. |
| 2018/0279208 | A1 | 9/2018 | Eskildsen et al. |
| 2018/0324607 | A1 | 11/2018 | Rengarajan et al. |
| 2019/0114337 | A1* | 4/2019 | George ................ G06F 16/902 |
| 2019/0132836 | A1 | 5/2019 | Li et al. |
| 2019/0197838 | A1 | 6/2019 | Beema et al. |
| 2019/0199578 | A1 | 6/2019 | Lakshminarayan et al. |
| 2019/0250899 | A1 | 8/2019 | Riedl et al. |
| 2019/0281371 | A1 | 9/2019 | Klicpera |
| 2019/0281608 | A1 | 9/2019 | Huang et al. |
| 2019/0380018 | A1 | 12/2019 | Tian |
| 2020/0037252 | A1* | 1/2020 | Chiarizio ............... G08B 27/00 |
| 2020/0068578 | A1 | 2/2020 | Lee et al. |
| 2020/0267561 | A1 | 8/2020 | Lakshminarayan et al. |
| 2020/0267738 | A1 | 8/2020 | Barbu et al. |
| 2020/0296664 | A1 | 9/2020 | Lakshminarayan et al. |
| 2021/0201486 | A1 | 7/2021 | Takenouchi |
| 2021/0250197 | A1 | 8/2021 | Lakshminarayan et al. |

FOREIGN PATENT DOCUMENTS

| | | | |
|---|---|---|---|
| EP | 3506719 | A1 | 7/2019 |
| EP | 3951732 | A1 | 2/2022 |
| JP | 2000341751 | A | 12/2000 |
| WO | 9819400 | A1 | 5/1998 |
| WO | 2016160215 | A1 | 10/2016 |
| WO | 2017143320 | A1 | 8/2017 |
| WO | 2020096969 | A1 | 5/2020 |
| WO | 2020195379 | A1 | 10/2020 |

OTHER PUBLICATIONS

IEEE 802.11, Wikipedia, The free Encyclopedia, last edit Dec. 30, 2019, accessed on Feb. 4, 2019, 15 pgs.

International Search Report and Written Opinion of the International Application No. PCT/US2022/011233, mailed May 2, 2022, 9 pg.

* cited by examiner

REPEATER FOR ENROLLMENT EXTENSION

RELATED APPLICATION

This application is a 35 U.S.C. 371 national stage filing from International Application No. PCT/US2022/011233, filed Jan. 5, 2022 which claims priority to U.S. provisional patent application No. 63/134,679 filed on Jan. 7, 2021, the entire contents of both of which are incorporated herein by reference.

TECHNICAL FIELD

This disclosure relates generally to the enrollment of a device at a premise using a repeater at the premise to extend the range at which the device can be enrolled in a system.

BACKGROUND

Security and/or home automation systems can include a variety of devices located throughout a premise. A repeater can be used at the premise to increase the range of the system (e.g., in a large home) by facilitating transmission and reception of data between a control panel and a remote device that would otherwise be out of range from the control panel.

However, currently the use of a repeater in such systems can complicate, and increase the costs associated with, system installation. As one example, after installing a repeater in the system, the installer typically must then take separate action to enroll the remote device at the control panel. This can include physically bringing the remote device within the range of the control panel, enrolling the remote device at the control panel, and then physically bringing the remote device back to its intended install location at the premise. In addition to increasing time and effort associated with installation, the different install method required for the remote device, as compared to the repeater, necessitates additional training and knowledge on the part of the installer.

SUMMARY

Embodiments disclosed herein can facilitate device enrollment in a premise system through a repeater of the system. As a result, the device can be enrolled in the system while placed at its intended location at the premise and, thus, the device need not be placed physically proximate the panel to successfully enroll the device in the system. The repeater can store enrollment data needed for device enrollment in the system, allowing the repeater and device to exchange enrollment data without needing to register the device directly with the control panel at the premise.

Consequently, embodiments disclosed herein can provide useful efficiencies in device enrollment in a premise system. For example, embodiments disclosed herein can reduce the time associated with enrolling a device in a premise system by eliminating the requirement that a device, to be installed at a remote location at the premise, be brought physically proximate the panel to enroll such device directly with the panel. Embodiments herein can allow this device to be enrolled in the premise system via the repeater, and enrollment of the device in the premise system via the repeater can be accomplished by an installer in a manner the same as, or similar to, as would be done if the device were enrolled in the premise system directly with the control panel. In addition, embodiments disclosed herein can reduce the complexity associated with enrolling a device in a premise system by facilitating a common installation process for the installer whether the device is enrolled via the repeater or directly at the control panel. By providing a common enrollment process when enrolling a device via the repeater as when enrolling a device directly at the control panel, embodiments disclosed herein can simplify the installation process and, thereby, reduce costs associated with installation (e.g., by eliminating the need for additional installer training, etc.)

An embodiment of a system includes a device (e.g., a sensor device), a repeater (e.g., a TDMA based repeater), and a control panel. The device is in two-way communication with the repeater, and the repeater is in two-way communication with the control panel. The repeater includes a repeater module storing child table data and routing table data. The child table data stored by the repeater module, at the repeater, can include a device address, device descriptor, and/or device status. The routing table data stored by the repeater module, at the repeater, can include channel operational information, such as a network ID, a first repeater operating channel of the repeater, a second repeater operating channel for the repeater different than the first repeater operating channel, a first information channel, and/or a second information channel different than the first information channel.

In a further embodiment of this system, the control panel includes a bridge module and an AP module. In one such embodiment, each of the bridge module and the AP module stores child table data and routing table data. For example, the child table data and the routing table data stored by the bridge module and the AP module can be the same as, or similar to, the information stored by the repeater module. The child table data stored by each of the bridge module and the AP module, at the control panel, can include, for instance, a device address, device descriptor, and/or device status. The routing table data stored by each of the bridge module and the AP module, at the control panel, can include channel operational information, such as a network ID, a panel operating channel a first repeater operating channel of the repeater, a second repeater operating channel for the repeater different than the first repeater operating channel, a first information channel, and/or a second information channel different than the first information channel.

One system embodiment includes a sensor device, a repeater, and a control panel. The repeater is in two-way communication with the sensor device, and the control panel is in two-way communication with the repeater. The repeater stores first child table data and first routing table data. The first child table data stored at the repeater includes at least one of a sensor device address corresponding to the sensor device, a sensor device descriptor corresponding to the sensor device, and a sensor device status corresponding to the sensor device. The first routing table data stored at the repeater includes first communication channel operational information.

In a further embodiment of the system, the first communication channel operational information stored at the repeater includes at least one of a network ID, a first repeater operating channel for the repeater, a second repeater operating channel for the repeater different than the first repeater operating channel, a first information channel, and a second information channel different than the first information channel. For instance, the first communication channel operational information stored at the repeater can include the network ID, the first repeater operating channel for the repeater, and the second repeater operating channel for the repeater different than the first repeater operating channel. In a further instance, the first communication channel operational information stored at the repeater further includes the first information channel and the second information channel different than the first information channel.

In a further embodiment of the system, the control panel stores second child table data and second routing table data. The second child table data stored at the control panel can be the same as the first child table stored at the repeater. The second routing table data stored at the control panel can be the same as the first routing table data stored at the repeater. For instance, the second child table data stored at the control panel can include at least one of the sensor device address corresponding to the sensor device, the sensor device descriptor corresponding to the sensor device, and the sensor device status corresponding to the sensor device. For instance, the second routing table data stored at the control panel can include second communication channel operational information. This second communication channel operational information stored at the control panel can include at least one of the network ID, the first repeater operating channel for the repeater, the second repeater operating channel for the repeater different than the first repeater operating channel, the first information channel, and the second information channel different than the first information channel. For instance, the second communication channel operational information stored at the control panel can include the network ID, the first repeater operating channel for the repeater, and the second repeater operating channel for the repeater different than the first repeater operating channel. And, in a further instance, the second communication channel operational information stored at the control panel can further include the first information channel and the second information channel different than the first information channel.

In a further embodiment of the system, the repeater can be a time division multiple access (TDMA) based repeater.

One repeater embodiment includes a repeater module and a transceiver. The repeater module stores child table data and routing table data. The child table data stored at the repeater can include at least one of a sensor device address corresponding to a sensor device, a sensor device descriptor corresponding to the sensor device, and a sensor device status corresponding to the sensor device. The routing table data stored at the repeater can include communication channel operational information. The transceiver can be configured to facilitate two-way communication with the sensor device.

In a further embodiment of the repeater, the communication channel operational information stored at the repeater can include at least one of a network ID, a first repeater operating channel for the repeater, a second repeater operating channel for the repeater different than the first repeater operating channel, a first information channel, and a second information channel different than the first information channel. For instance, the communication channel operational information stored at the repeater can include the network ID, the first repeater operating channel for the repeater, and the second repeater operating channel for the repeater different than the first repeater operating channel. In a further instance, the communication channel operational information stored at the repeater can further include the first information channel and the second information channel different than the first information channel.

In a further embodiment of the repeater, the child table data stored at the repeater can include each of the sensor device address corresponding to the sensor device and the sensor device descriptor corresponding to the sensor device. And, in some cases, the child table data stored at the repeater can further include the sensor device status corresponding to the sensor device.

In a further embodiment of the repeater, the repeater is a time division multiple access (TDMA) based repeater.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

FIG. 2 shows exemplary data stored and accessed by each of these module embodiments.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
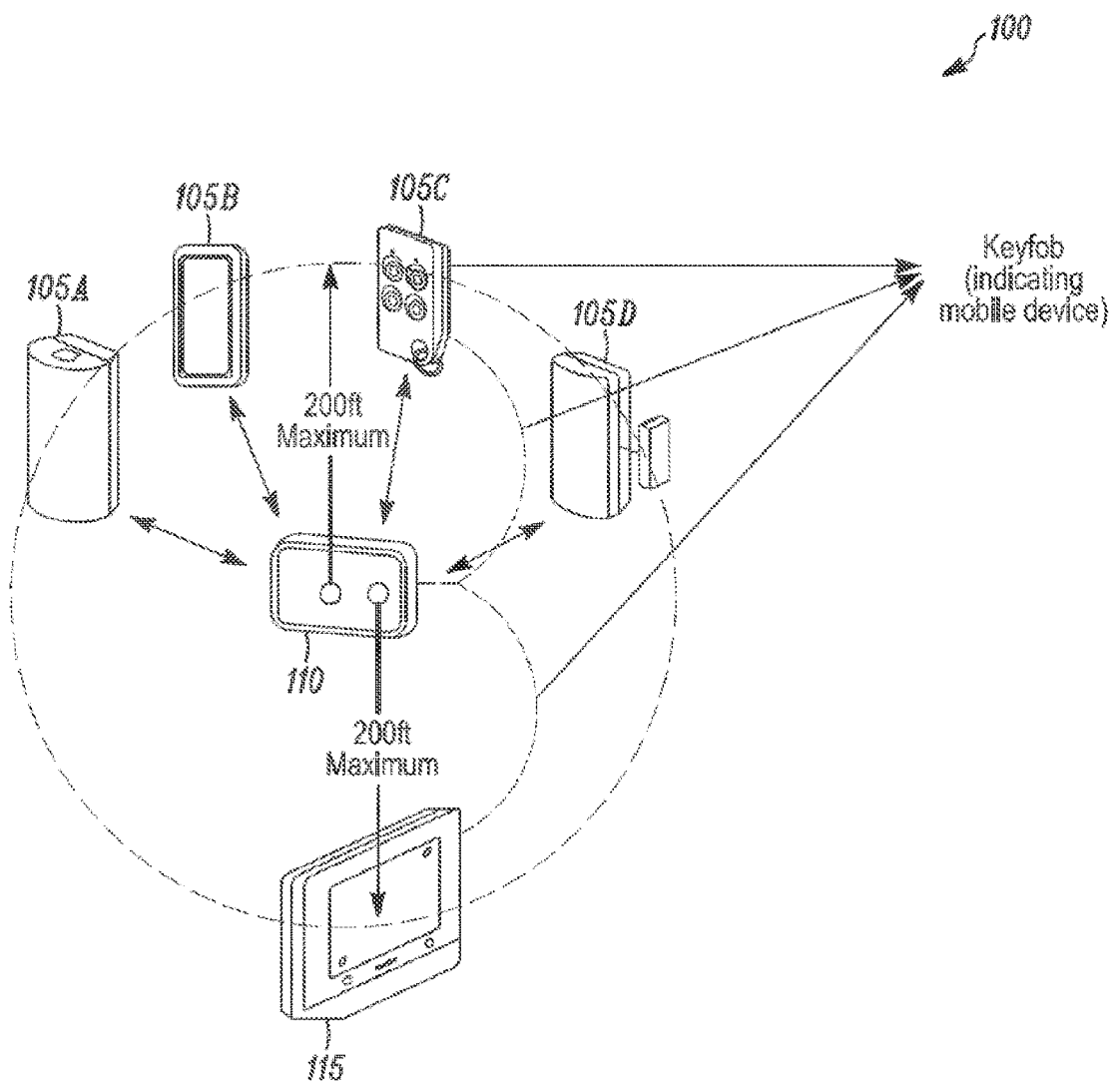
FIG. 1 is a diagram of an embodiment of a system for device enrollment through a repeater.

FIG. 1 illustrates one embodiment of a system 100. The system 100 includes devices 105A-D, repeater 110, and control panel 115. The devices 105A-D can be devices of a home security and/or automation system, such as sensors (e.g., motion, glass break, etc.), audio communication devices, switches, and life safety devices. For instance, one or more of the devices 105A-105D can be located at the premise outside of an effective enrollment range of the control panel 115. As shown in FIG. 1, the each of the devices 105A-105D in is wireless two-way communication with the repeater 110, and the repeater 110 is in wireless two-way communication with the control panel 115. The control panel 110 can be in two-way communication with other premise devices of the system 100 as well as with a remote server (not shown) located away from the premise where the system 100 is located. Through the remote server, the control panel 110 can be in two-way communication with a remote user device (e.g., a computing device including a processor for executing one or more computer executable instructions stored thereat).

For example, the system 100 can be a TDMA (time division multiple access) based system. This can include the repeater 110 being a TDMA based repeater using a TDMA channel access method for communication with other components (e.g., devices 105A-105D and control panel 115) within the system 100. As one example, the TDMA based system can run with two different information channels and provide data transmission on those channels at periodic intervals (e.g., every 250 ms). This can facilitate a network operation manager ("NOM") at a device 105A-105D to ascertain the operating channel of its potential parent, as detailed further below. Using the NOM of each device 105A-105D, the device 105A-10D can be configured, for example via the control panel 115, with desired operational parameters, such as type of sensor at device 105A-105D, channels used for information communication at device 105A-105D, frequency of supervision interval with device 105A-105D, and/or a number of messages to be buffered in different operational conditions at device 105A-10D and/or the system 100. Moreover, the TDMA based system can allow the NOM of each device 105A-105D to use the information channels to ascertain the respective channels of potential parents and then act to join such parent on the channel determined to be suitable for use by the device 105A-105D. The information channels can be provided during enrollment and can also be changed during the course of run. In this way, the system 100 can have the capability to self-heal by providing immunity against the local interference around the sensor by switching to a channel experiencing less such local interference.

The system 100 can be configured to facilitate the enrollment of one or more (e.g., each) of devices 105A-D through the repeater 110.

For example, when a device 105A-105D is triggered for enrollment in the system 100 (e.g., by installing battery at device 105A-105, actuating enrollment mechanism, etc.), the device 105A-105D can actuate a channel scanner of the device 105A-105D. The channel scanner of the device 105A-105D can scan available communication channels in the system 100 and determine a channel having a suitable strength for communications to and from the device 105A-15D. For instance, the channel scanner of the device 105A-105D can scan the energy of available communication channels in the system 100 and determine a channel having the strongest signal strength. In many cases, the repeater 110 and the control panel 115 can utilize different communication channels, and the channel scanner determination of the channel having a suitable characteristic (e.g., channel strength) can determine whether the device 105A-105D will enroll in the system via the repeater 110 as parent or via directly with the control panel 115 as parent. In this way, the devices 105A-105D can determine, upon enrollment triggering, whether to enroll in the system via the repeater 110 as parent or via directly with the control panel 115 as parent and, when so determined, send an enrollment association request to the repeater 110 or control panel 115.

The repeater 110, even though a child of the control panel 115, can be a fully functional device of the system 100 and, thereby, act as a parent to the device(s) 105A-105D enrolled through the repeater 110. As such, the repeater 110 can receive the enrollment association request from the device(s) 105A-105D and, in response, transmit the corresponding profile data of the device(s) 105A-105D to the control panel 115. When the system 100 includes a remote server in communication with the control panel 115, the control panel 115 can transmit to the remote server the corresponding profile data of the device(s) 105A-105D, received from the repeater 110, and an enrollment acceptance message can be transmitted from the remote server to the control panel 115, then from the control panel 115 to the repeater 110, and finally from the repeater 110 to the device(s) 105A-105D to enroll the device(s) 105A-105(D) in the system 100 via the repeater 110.

Notably, once device enrollment is accepted, embodiments disclosed herein can exchange the same information within the system 100 whether the device(s) 105A-105D is enrolled via the repeater 110 or via directly with the control panel 115. This can be accomplished, at least in part, due to the data stored and accessed by a module at the repeater 110, as will be described further in reference to FIG. 2.

The devices 105A-105D enrolled in the system 100 can store data useful for communication within the system 100. For example, the devices 105A-105D can store an operating channel of the repeater ("RP"), and operating channel of the control panel ("OC") (which can be a different channel than the operating channel of the repeater), a first information channel ("IC1"), a second information channel ("IC2") (which can be a different channel than IC1) to enable two-way communication with device's parent, whether that parent is the repeater 110 or the control panel 115 (e.g., as determined via the device's cannel scanner).

Figure 2:
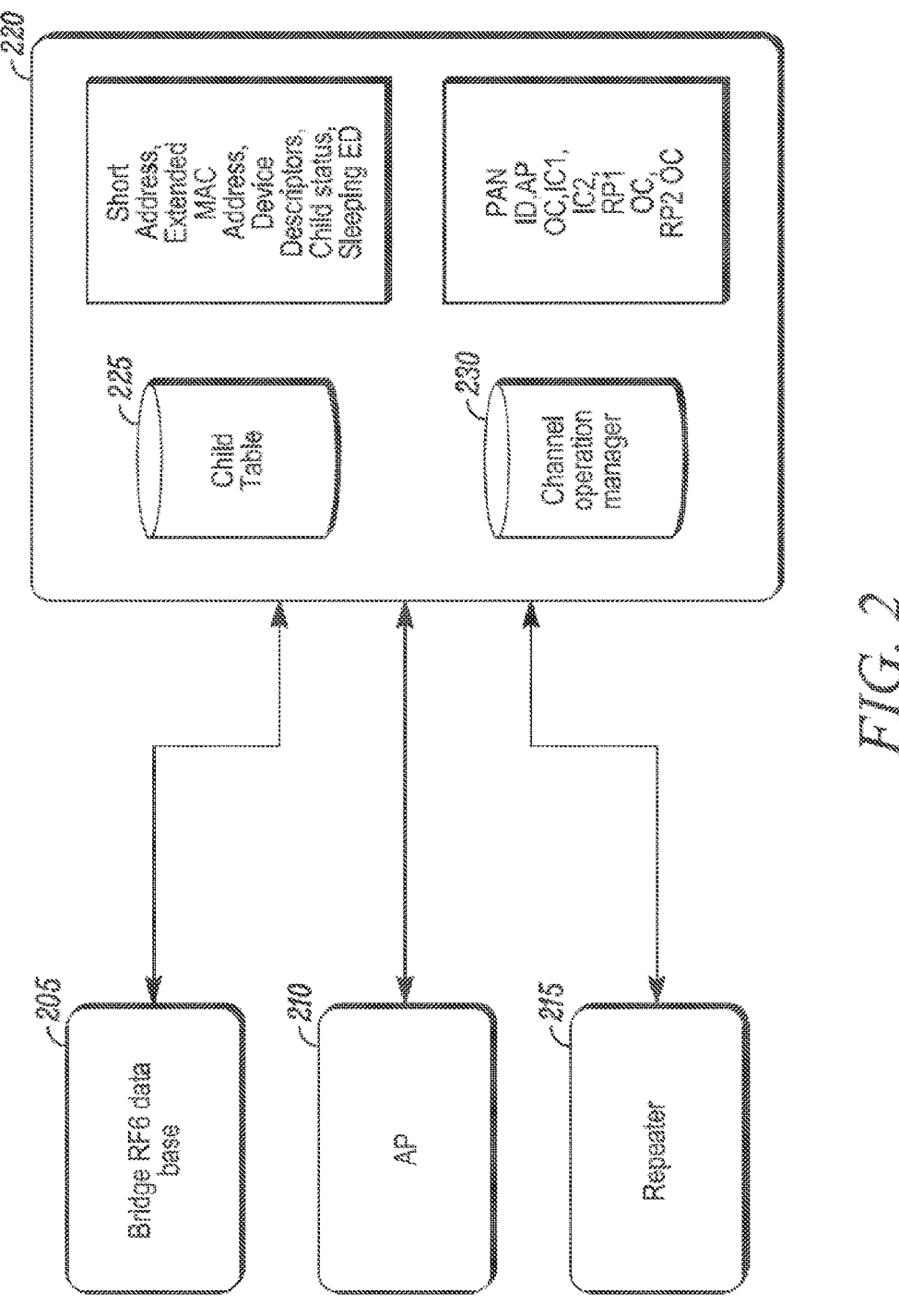
FIG. 2 is a block diagram of module embodiments included in the system of FIG. 1. Specifically.

FIG. 2 is a block diagram of module embodiments 205, 210, 215 included in the system of FIG. 1. Specifically, FIG. 2 shows exemplary data 220, such as child table information and channel operation information, stored and accessed by each of these module embodiments 205, 210, 215. The module embodiments 205, 210, 215 and the data 220 can, in some instance, collectively be referred to as sensor range extend optimizer ("SREO") package.

For example, in certain embodiments, the module 205 can be a bridge module at the control panel 115 of the system 100, the module 210 can be an AP module at the control panel 115 of the system 100, and the module 215 can be a repeater module at the repeater 110 of the system 100. The bridge module 205, at the control panel 115, can be coupled to a transceiver, at the control panel 115, for communication with the remote server (e.g., via a cellular transceiver at the control panel 115). The AP module 210, at the control panel 115, can be coupled to a transceiver, at the control panel 115, for communication with one or more local components in the system 100, such as the repeater 110 and/or the device(s) 105A-105D (e.g., via Wi-Fi). The repeater module 215, at the repeater 110, can be coupled to a transceiver, at the repeater 110, for communication with the control panel 115 (e.g., via Wi-Fi).

As noted, each of the modules 205, 210, 215 can store and access data 220. The data 220 stored and accessed by each of the modules 205, 210, 215 can include one or both of child table information 225 and channel operation information 230. The child table information 225 can include one or more (e.g., each) of: short address, extended MAC address, device descriptors (e.g., device type), child status, and sleep/awake mode. The channel operation information 230 can include one or more (e.g., each) of: PAN network identification information ("PAN ID"), control panel operating channel(s) ("AP OC"), repeater operating channel(s) ("RP1 OC" and "RP2 OC"), and information channels ("IC1" and "IC2").

Thus, the repeater module 215, at the repeater 110, can store all child table data and routing table data for (e.g. all) devices 105A-105D, and in some cases one or more other repeaters, in the system 100. The repeater module 215 can receive this data from the control panel (e.g., from the AP module 210) and store this data at the repeater 110. Then, this data at the repeater module 215 at the repeater 110 can be used for selecting the optimizing channel for beaconing from the control panel 115, which can be a different channel than others (e.g., the AP channel) used at the control panel 115. The repeater module 115 can also receive and store different information channels (e.g., IC1, IC2), such as for use in the TDMA based system 100.

In particular, the bridge module 205, at the control panel 115, can be configured to facilitate transmission of the child table data and the routing table data to the AP module 210, at the control panel 115. The control panel 115 can use the child table data and the routing table data to select channels for communication within the system 100 (e.g., for the repeater 110) and to select information channels (e.g., each of IC1 and IC2).

The AP module 210 can be useful in transmitting operational information, such as in response to a reset at the control panel 115 or the repeater 110. For example, the AP module 210 can transmit the child table data and the routing table data (including related operating channel(s)) to the repeater 110 (and, in some cases, to other repeaters of the system 100). The AP module 210 can likewise be configured to update data stored at the repeater 110 (e.g., stored at the repeater module 215), such as when a new device 105A-105D in installed in the system 100. And, the AP module 210 can be configured to assist in new channel selection, for instance at the repeater 110 when so triggered at the repeater 110 or device(s) 105A-105D.

Thus, the system 100 can include the repeater 110, and the repeater 110 of the system 100 can include the repeater module 215 storing the noted information, such as the child table information 225 (e.g., including one or more of: short address, extended MAC address, device descriptors, child status, and sleep/awake mode) and the channel operation information 230 (e.g., including one or more of: PAN ID, AP OC, RP1 OC, RP2 OC, IC1, and IC2). Accordingly, the device(s) 105A-105D can be enrolled via the repeater 110 using this information stored at the repeater module 215. Because this information stored at the repeater module 215 can be the same as, or similar to, the information stored at the control panel 115, the installer of the device(s) 105A-105D can be provided with a same installation experience whether the device(s) 105A-105D is enrolled via the repeater 100 or via directly with the control panel 115. Moreover, the storage of this information at the repeater module 215 can facilitate the ability to trigger one-go-all-go functionality for device(s) 105A-105D enrolled via the repeater 110.

Also, the device(s) 105A-105D cab store its respective parent (e.g., repeater 110 or control panel 115) channel to facilitate data exchange with the respective parent. For example, where the device's parent is the repeater 110, the device can store RP1 OC, RP2 OC, IC1, and/or IC2 to facilitate data transmission to the parent repeater.

One exemplary advantage of certain embodiments disclosed herein is that adding a system compatible repeater can allow for extending the range of a keyfob device in the system 100. This can result, for instance, because the keyfob device can now be in communication with the repeater as a result of the panel and repeater storing the same, or similar, operational information. Another exemplary advantage of certain embodiments disclosed herein is that the need to re-enroll a device with a newly added repeater can be eliminated. This can result, for instance, because the newly added repeater can store the same operational information that the already installed repeater includes. This can allow for a relatively seamless transition for a device in the system to switch from enrollment and communication with one repeater to another, new added repeater. Likewise, embodiments disclosed herein can support control panel replacement (e.g., when the control panel is broken, etc.) without needing to replace the devices previously enrolled in the system and without needing to replace the repeater. This can result, for instance, because the repeater can store the same operational information that the prior control panel stored and the repeater can then convey this stored operational information to the new, replacement control panel.

Various examples have been described. These and other examples are within the scope of the following claims.

What is claimed is:

1. A system comprising:
a sensor device;
a repeater in two-way communication with the sensor device, the repeater storing first child table data and first routing table data, wherein the first child table data stored at the repeater includes at least one of a sensor device address corresponding to the sensor device, a sensor device descriptor corresponding to the sensor device, and a sensor device status corresponding to the sensor device, and wherein the first routing table data stored at the repeater includes first communication channel operational information including information channels different than repeater operating channel(s), the information channels being provided during enrollment and configured to provide data transmission on those channels at periodic intervals to facilitate a network operation manager (NOM) at the sensor device to determine the operating channel of its potential parent and to act to join such parent on the channel determined to be suitable for use by the sensor device while the sensor device is placed at its intended location at the premise; and
a control panel in two-way communication with the repeater, wherein device enrollment in the system is via the repeater, allowing the repeater and the sensor device to exchange enrollment data without needing to register the sensor device directly with the control panel at the premise.

2. The system of claim 1, wherein the first communication channel operational information stored at the repeater includes at least one of a network ID, a first repeater operating channel for the repeater, a second repeater operating channel for the repeater different than the first repeater operating channel, a first information channel, and a second information channel different than the first information channel.

3. The system of claim 2, wherein the first communication channel operational information stored at the repeater includes the network ID, the first repeater operating channel for the repeater, and the second repeater operating channel for the repeater different than the first repeater operating channel.

4. The system of claim 3, wherein the first communication channel operational information stored at the repeater further includes the first information channel and the second information channel different than the first information channel.

5. The system of claim 1, wherein the control panel stores second child table data and second routing table data.

6. The system of claim 5, wherein the second child table data stored at the control panel is the same as the first child table stored at the repeater.

7. The system of claim 6, wherein the second routing table data stored at the control panel is the same as the first routing table data stored at the repeater.

8. The system of claim 5, wherein the second child table data stored at the control panel includes at least one of the sensor device address corresponding to the sensor device, the sensor device descriptor corresponding to the sensor device, and the sensor device status corresponding to the sensor device.

9. The system of claim 5, wherein the second routing table data stored at the control panel includes second communication channel operational information.

10. The system of claim 9, wherein the second communication channel operational information stored at the control panel includes at least one of the network ID, the first repeater operating channel for the repeater, the second repeater operating channel for the repeater different than the first repeater operating channel, the first information channel, and the second information channel different than the first information channel.

11. The system of claim 10, wherein the second communication channel operational information stored at the control panel includes the network ID, the first repeater operating channel for the repeater, and the second repeater operating channel for the repeater different than the first repeater operating channel.

12. The system of claim 11, wherein the second communication channel operational information stored at the control panel further includes the first information channel and the second information channel different than the first information channel.

13. The system of claim 1, wherein the repeater is a time division multiple access (TDMA) based repeater.

14. A repeater comprising:
a repeater module storing child table data and routing table data, wherein the child table data stored at the repeater includes at least one of a sensor device address corresponding to a sensor device, a sensor device descriptor corresponding to the sensor device, and a sensor device status corresponding to the sensor device, and wherein the routing table data stored at the repeater includes communication channel operational information including information channels different than repeater operating channel(s), the information channels being provided during enrollment and configured to provide data transmission on those channels at periodic intervals to facilitate a network operation manager (NOM) at the sensor device to determine the operating channel of its potential parent and to act to join such parent on the channel determined to be suitable for use by the sensor device while the sensor device is placed at its intended location at the premise, and wherein the repeater module stores enrollment data needed for device enrollment in the system, allowing the repeater and the sensor device to exchange enrollment data without needing to register the sensor device directly with the control panel at the premise; and
a transceiver configured to facilitate two-way communication with the sensor device.

15. The repeater of claim 14, wherein the communication channel operational information stored at the repeater includes at least one of a network ID, a first repeater operating channel for the repeater, a second repeater operating channel for the repeater different than the first repeater operating channel, a first information channel, and a second information channel different than the first information channel.

16. The system of claim 15, wherein the communication channel operational information stored at the repeater includes the network ID, the first repeater operating channel for the repeater, and the second repeater operating channel for the repeater different than the first repeater operating channel.

17. The system of claim 16, wherein the communication channel operational information stored at the repeater further includes the first information channel and the second information channel different than the first information channel.

18. The repeater of claim 14, wherein the child table data stored at the repeater includes each of the sensor device address corresponding to the sensor device and the sensor device descriptor corresponding to the sensor device.

19. The repeater of claim 18, wherein the child table data stored at the repeater further includes the sensor device status corresponding to the sensor device.

20. The repeater of claim 14, wherein the repeater is a time division multiple access (TDMA) based repeater.

* * * * *